(12) United States Patent
Hodge et al.

(10) Patent No.: US 11,137,038 B2
(45) Date of Patent: Oct. 5, 2021

(54) FOUR MODE SWITCHABLE ONE WAY CLUTCH

(71) Applicant: Schaeffler Technologies AG & Co. KG, Herzogenaurach (DE)

(72) Inventors: Michael Hodge, Creston, OH (US); Kenneth Hunt, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/774,083

(22) Filed: Jan. 28, 2020

(65) Prior Publication Data
US 2020/0240480 A1 Jul. 30, 2020

Related U.S. Application Data

(60) Provisional application No. 62/797,499, filed on Jan. 28, 2019.

(51) Int. Cl.
*F16D 41/16* (2006.01)
*F16D 1/10* (2006.01)

(52) U.S. Cl.
CPC .............. *F16D 41/16* (2013.01); *F16D 1/10* (2013.01); *F16D 2001/103* (2013.01)

(58) Field of Classification Search
CPC .......... F16D 41/07; F16D 41/08; F16D 41/88; F16D 41/10; F16D 41/16; F16D 41/067; F16D 2001/103
USPC ....................................................... 192/43.1
See application file for complete search history.

(56) References Cited

U.S. PATENT DOCUMENTS

| 2,773,574 | A | * | 12/1956 | Able | B25B 13/465 |
| | | | | | 192/43.1 |
| 2,777,551 | A | * | 1/1957 | Banker | F16D 41/07 |
| | | | | | 192/45.1 |
| 5,971,123 | A | | 10/1999 | Ochab et al. | |
| 6,622,837 | B2 | | 9/2003 | Ochab et al. | |
| 6,629,590 | B2 | | 10/2003 | Ochab et al. | |
| 6,722,484 | B2 | | 4/2004 | Ochab et al. | |

(Continued)

FOREIGN PATENT DOCUMENTS

| JP | 2006-250350 A | 9/2006 |
| KR | 10-2000-0062656 A | 10/2000 |

(Continued)

*Primary Examiner* — Charles A Fox
*Assistant Examiner* — Tracey E. Bell
(74) *Attorney, Agent, or Firm* — LeKeisha M. Suggs

(57) ABSTRACT

A one-way clutch assembly comprises an outer race, first and second inner races rotatable about an axis, a first and a second plurality of rocker members, and first and second cages. The outer race has a plurality of pockets defined in an inner surface. First and second inner races are aligned axially side-by-side and each include rocker teeth defined on an outer surface. One rocker member from the first and second plurality of rocker members is disposed in each pocket of the outer race. The first plurality of rocker members are arranged to face in a first direction and the second plurality of rocker members are arranged to face in a second, opposite direction. First and second cages are positioned radially between the inner and outer races and configured to selectively displace the first and second plurality of rocker members, respectively, between disengaged and engaged positions.

12 Claims, 5 Drawing Sheets

(56) References Cited

U.S. PATENT DOCUMENTS

| | | | |
|---|---|---|---|
| 8,840,514 B1 | 9/2014 | Knickerbocker et al. | |
| 8,857,294 B2 | 10/2014 | Brewer et al. | |
| 8,857,589 B2 | 10/2014 | Heath et al. | |
| 8,919,513 B2 | 12/2014 | Heath et al. | |
| 9,022,195 B2 | 5/2015 | Heath et al. | |
| 9,360,059 B2 | 6/2016 | Palmer et al. | |
| 10,563,710 B2 * | 2/2020 | Shioiri | F16D 41/14 |
| 10,711,853 B2 * | 7/2020 | Hand | F16D 41/125 |
| 2008/0169166 A1 | 7/2008 | Wittkopp et al. | |
| 2009/0205918 A1 * | 8/2009 | Samie | F16D 25/061 |
| | | | 192/43.1 |
| 2009/0321207 A1 * | 12/2009 | Kario | F16D 41/07 |
| | | | 192/45.1 |
| 2010/0122883 A1 | 5/2010 | Bartos et al. | |
| 2020/0096058 A1 * | 3/2020 | Hunt | F16D 23/12 |
| 2020/0182312 A1 * | 6/2020 | Burke | F16D 41/14 |

FOREIGN PATENT DOCUMENTS

| | | | |
|---|---|---|---|
| WO | 0240891 | A2 | 5/2002 |
| WO | 2014143090 | A1 | 9/2014 |
| WO | 2015-013802 | A1 | 2/2015 |

\* cited by examiner

FOUR MODE SWITCHABLE ONE WAY CLUTCH

CROSS-REFERENCE TO RELATED APPLICATIONS

This application claims the benefit of U.S. provisional application Ser. No. 62/797,499 filed Jan. 28, 2019, the disclosure of which is hereby incorporated in its entirety by reference herein.

TECHNICAL FIELD

The present disclosure relates in general to one-way clutches for a transmission, and more particularly to a four-mode switchable one-way clutch assembly.

BACKGROUND

One-way clutches are known, particularly in vehicle transmission settings. One-way clutches enable torque to transmit in one rotational direction while inhibiting torque from transmitting in the other rotational direction by disengaging or freewheeling.

SUMMARY

According to one embodiment, a one-way clutch assembly comprises an outer race, first and second inner races rotatable about an axis, a first and a second plurality of rocker members, and first and second cages. The outer race has a plurality of pockets defined in an inner surface. First and second inner races are aligned axially side-by-side and each include rocker teeth defined on an outer surface. One rocker member from the first plurality of rocker members and one rocker member from the second plurality of rocker members is disposed in each pocket of the outer race. The first plurality of rocker members are arranged to face in a first direction and the second plurality of rocker members are arranged to face in a second direction, opposite the first direction. First and second cages are positioned radially between the inner and outer races and configured to selectively displace the first and second plurality of rocker members, respectively, between a disengaged position and an engaged position.

In embodiments, the first and second cages each include a plurality of biasing members configured to bias the first and second plurality of rocker members toward engagement with the rocker teeth of the first and second inner races, respectively. In some embodiments, the biasing members may be leaf springs. In other embodiments, the first and second cages each include a plurality of openings, wherein the first and second plurality of rocker members are positioned in the openings of the first and second cages, respectively. The first and second cages retain the first and second plurality of rocker members, respectively, in an axial and a radial direction. In embodiments, the first and second cages each include a plurality of tabs extending into each opening toward the rocker members, wherein the tabs are configured to displace the rocker members to the disengaged position when the first and second cages are rotated in a first rotational direction or a second rotational direction, opposite the first rotational direction. The outer race may include a plurality of splines defined on an outer surface for connecting to a transmission housing. The clutch assembly may further include an inner race hub having first and second grooves defined in an outer surface, wherein the first and second inner races are pressed on the outer surface of the inner race hub. In embodiments, the clutch assembly includes first and second cover plates configured to retain the one-way clutch and center the outer race to the inner race hub. First and second retaining rings may be disposed in the first and second grooves of the inner race hub, respectively, and be configured to retain the first and second cover plates.

In another embodiment, a one-way clutch assembly comprises an outer race, first and second inner races, a first and second plurality of rocker members, a plurality of biasing members, and first and second cages. The outer race has a plurality of pockets defined in an inner surface. The first and second inner races are arranged axially side-by-side on an inner race hub and each have rocker teeth defined on an outer surface. One rocker member from the first plurality of rocker members and one rocker member from the second plurality of rocker members is disposed in each pocket of the outer race. The one rocker member of the first plurality of rocker members is arranged to face in a first direction and the one rocker member of the second plurality of rocker members is arranged to face in a second direction opposite the first direction. A plurality of biasing members are arranged for biasing the first and second plurality of rocker members toward engagement with the rocker teeth of the first and second inner races, respectively. First and second cages are disposed between the inner and outer races, wherein rotation of the first and second cages in a first rotational direction or a second rotational direction, opposite the first rotational direction, moves the first and second plurality of rocker members between a disengaged position and an engaged position with respect to the rocker teeth of the first and second inner races.

In some embodiments, the plurality of biasing members are retained in the outer race. In embodiments, the plurality of biasing members are leaf springs having a first end disposed in a groove formed in the inner surface of the outer race and a second end, axially opposite the first end, arranged to engage with the rocker members. In other embodiments, the plurality of biasing members are retained in the first and second cages. Rotation of the first and second cages in the first or second rotational directions permits the one-way clutch to act as a one-way clutch in either direction, lock in both directions, and freewheel in both directions. In embodiments, the first and second cages include a plurality of openings, each of the first and second plurality of rocker members being positioned in each of the openings of the first and second cages, respectively. A plurality of tabs may extend into each of the openings and be arranged to urge the rocker members away from engagement with the rocker teeth. In some embodiments, each of the rocker members includes a body portion, a first segment, and a second segment. The body portion may be arranged to engage with the pockets of the outer race, the body portion being pivotable within each pocket. The first segment may extend in a first axial direction and be arranged to engage with the biasing members and the rocker teeth. The second segment may extend in a second axial direction, opposite the first axial direction, arranged for engaging with the plurality of tabs.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein should be understood to be referring to the orientation of the structure depicted in the figures. If an object is said to be extending about an axis, then terms such as "radial" and "axial" are relative to the axis. For example, the "axial" direction is one along or parallel to an axis such as a central axis, and the "radial" direction is normal to the axial direction. An "axial" surface is a surface extending at least partially in the radial direction but located at a particular axial point along the axis. Likewise, a "radial" surface is a surface extending at least partially in the axial direction but located at a particular radial distance from the axis. "Inner" and "outer" also are relative to the axis; for example, an "inner surface" may be a surface facing the axis, and an "outer surface" may be a surface facing away from the axis. Rotation can be relative to the axis. These terms can be used as explained above unless otherwise noted.

According to embodiments described below, a one-way clutch is provided that has four modes of operation. That is, the clutch disclosed can act as a one-way clutch in either rotational directions, lock in both rotational directions, and freewheel in both rotational directions.

Figure 1:
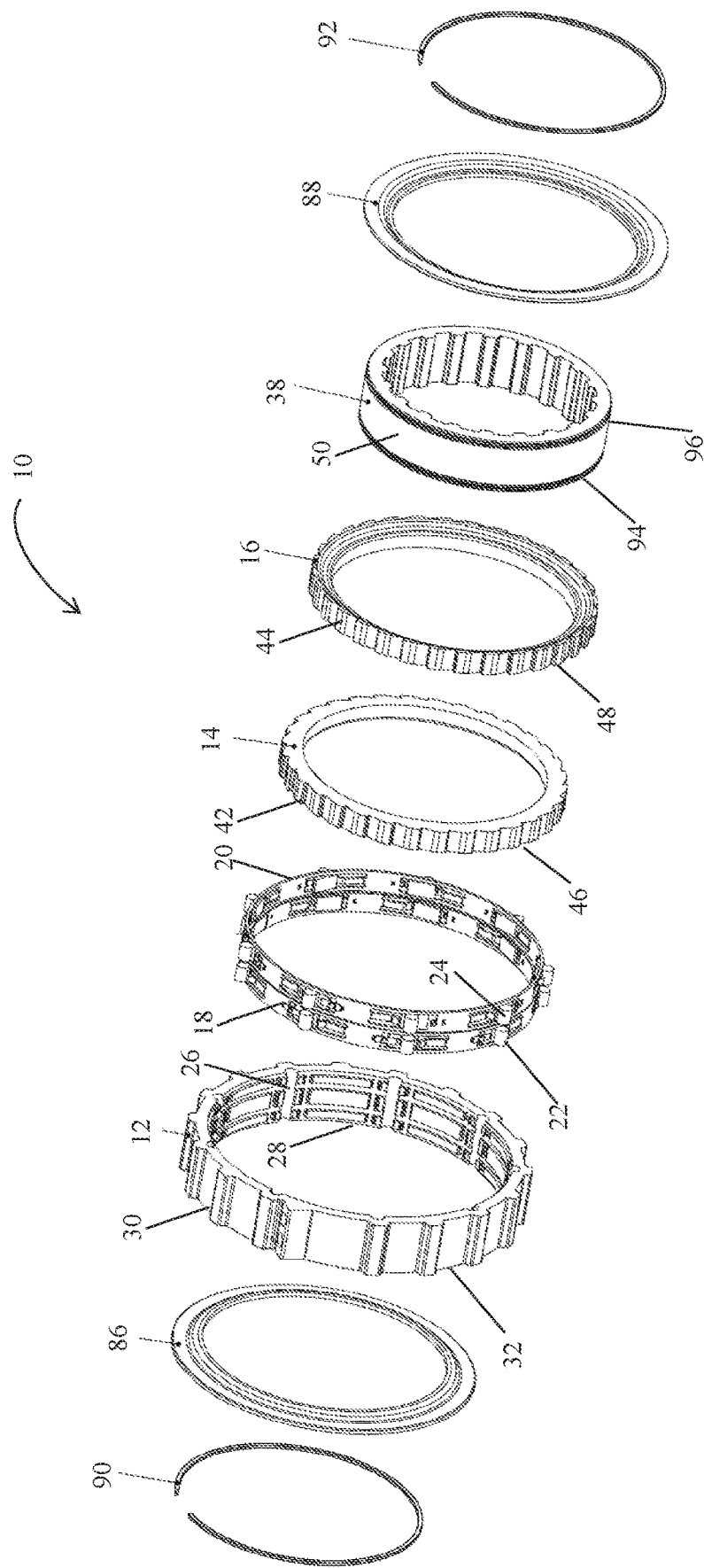
FIG. 1 shows an exploded perspective view of a four mode switchable clutch assembly, according to one embodiment.
Figure 2:
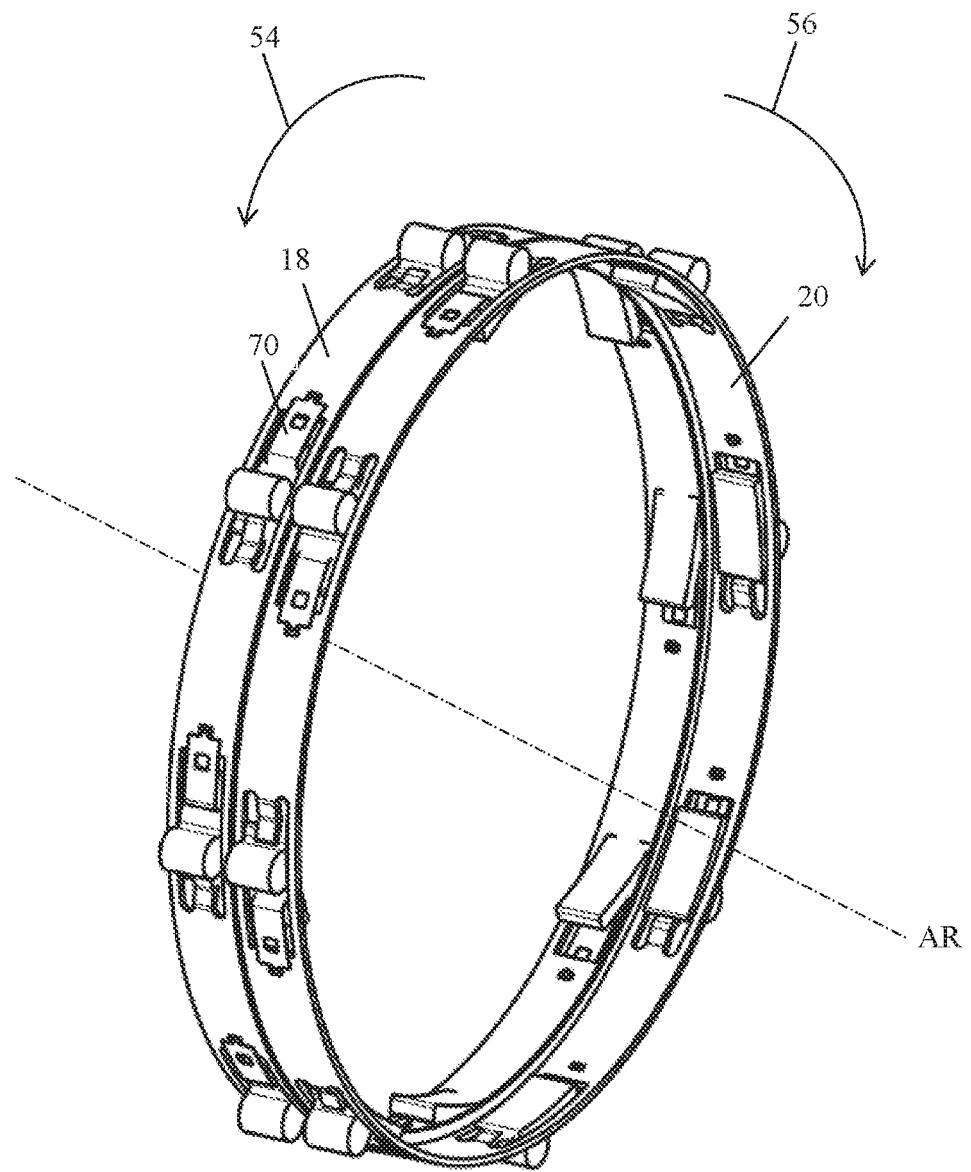
FIG. 2 shows the first and second cages of the clutch assembly shown in FIG. 1.
Figure 3:
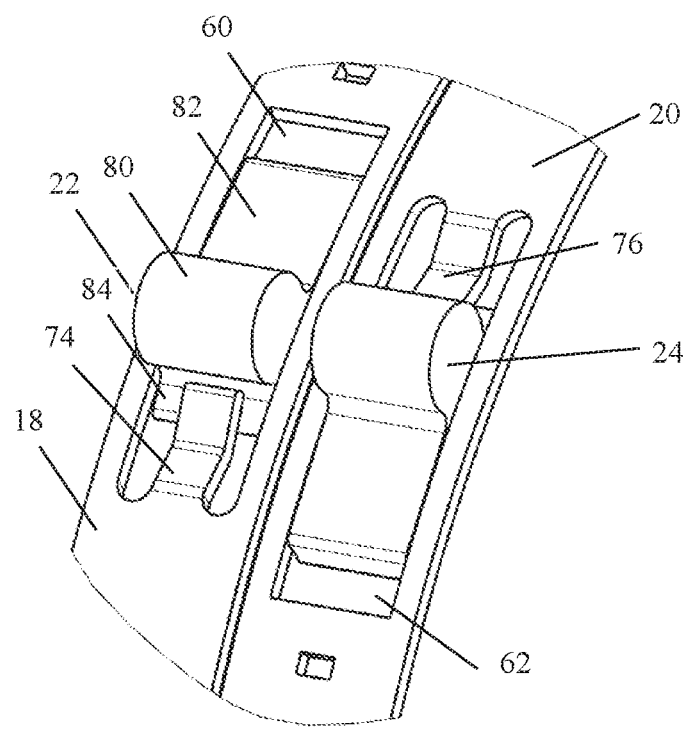
FIG. 3 is an enlarged view of a portion of the first and second cages shown in FIG. 2.
Figure 4:
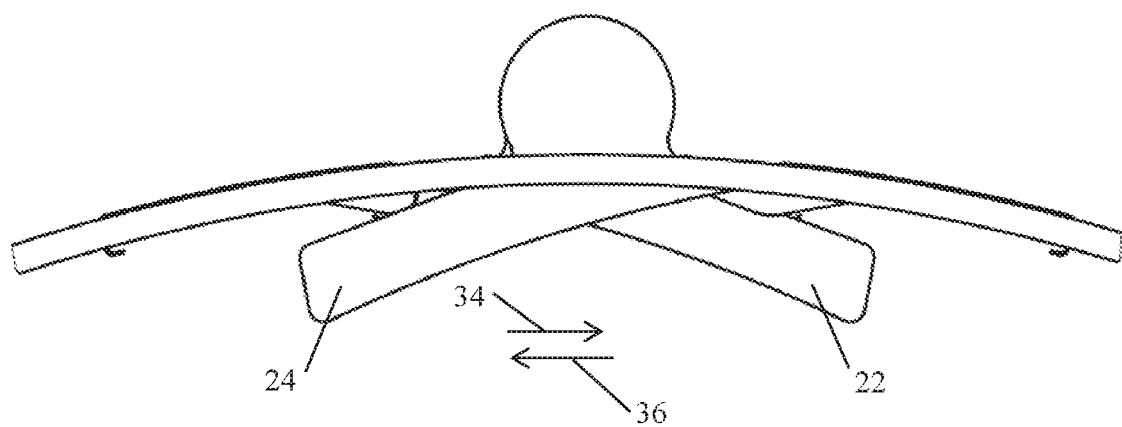
FIG. 4 shows an enlarged view of the rocker members associated with the clutch assembly shown in FIG. 1.
Figure 5:
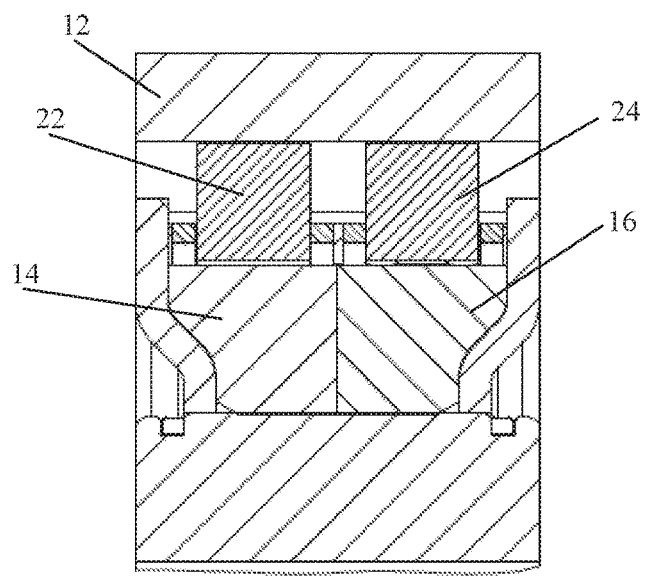
FIG. 5 shows a cross-sectional view of the assembled clutch assembly shown in FIG. 1.
Figure 6A:
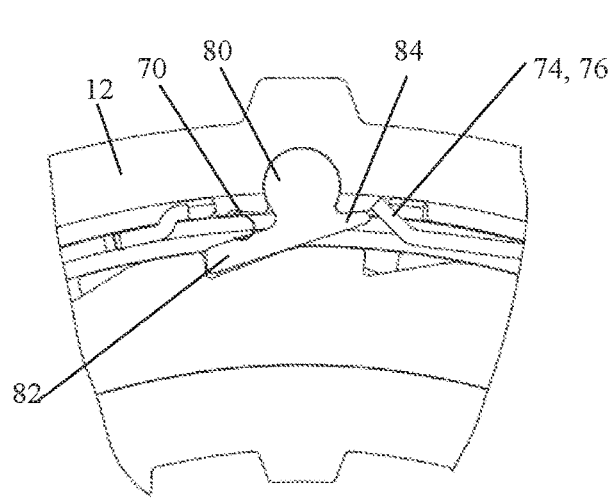
FIG. 6A shows an engaged or one-way clutch mode of operation of the clutch assembly shown in FIG. 1.
Figure 6B:
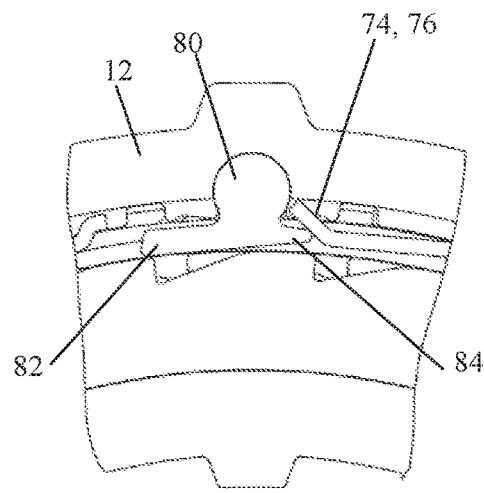
FIG. 6B shows a disengaged or freewheel mode of operation of the clutch assembly shown in FIG. 1.
Figure 7:
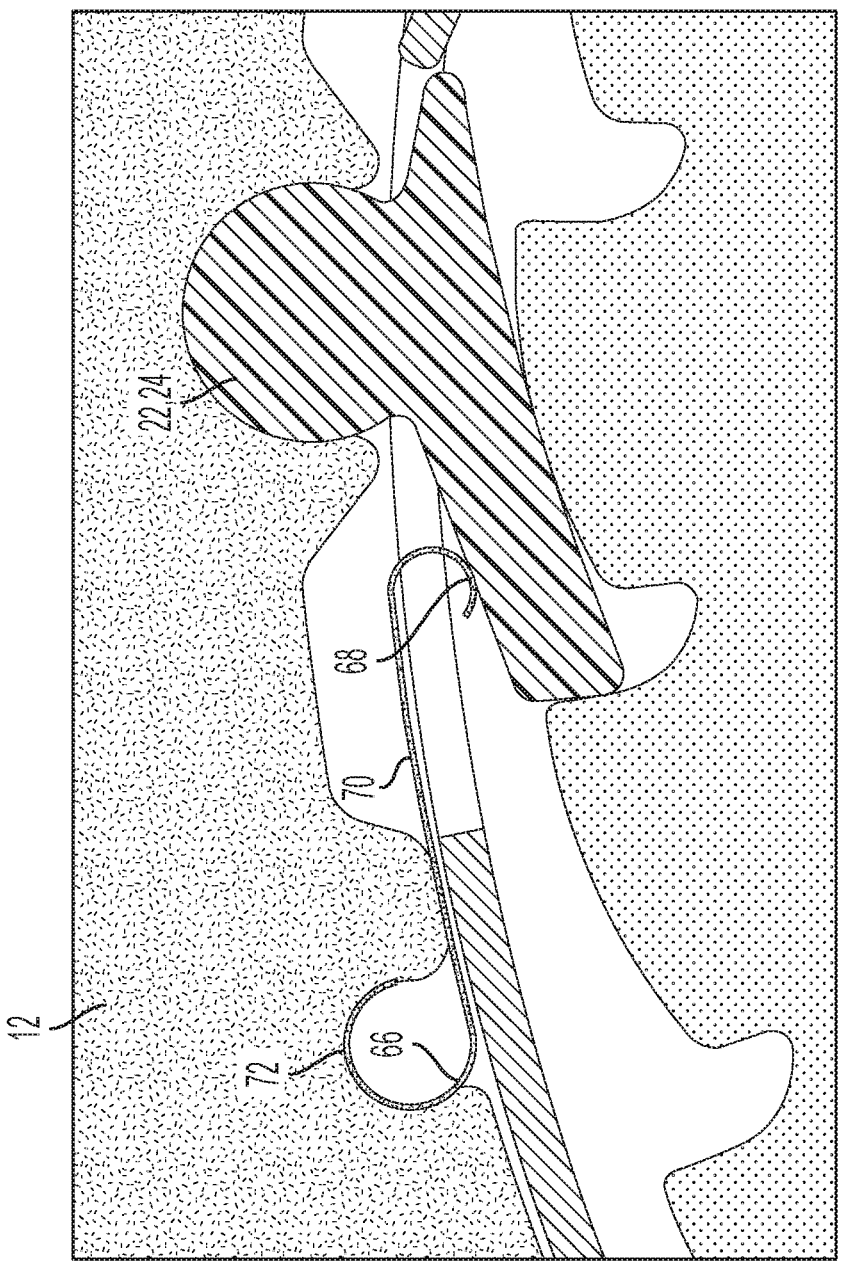
FIG. 7 shows a cross-sectional view of an alternative embodiment of the clutch assembly of FIG. 1.

Various figures are shown and referred to below. The following description is made in reference to FIGS. 1-7.

One-way clutch assembly 10 includes an axis of rotation AR, an outer race 12, first and second inner races 14, 16, first and second cages 18, 20, a first plurality of rocker members 22, and a second plurality of rocker members 24. Outer race 12 has a plurality of pockets 26 defined in an inner surface 28 and surface features 30 disposed on an outer surface 32 for coupling to a transmission housing (not shown). Surface features 30 may be splines, for example. One rocker member from the first plurality of rocker members 22 and one rocker member from the second plurality of rocker members 24 is disposed in each pocket 26 of the outer race 12 and arranged to be pivotable in each pocket 26. Each pocket 26 may be of suitable shape to allow for rotation of the rocker members 22, 24. For example, each pocket 26 may have a rounded shape. Inner surface 28 of outer race 12 may also include additional features to facilitate movement or rotation of rocker members 22, 24 such as shaped ramps in addition to pockets 26. The first plurality of rocker members 22 are arranged to face in a first direction 34 and the second plurality of rocker members are arranged to face in a second direction 36, opposite the first direction 34. That is, each pocket 26 of outer race 12 includes two rocker members, one from the first plurality of rocker members 22 and one from the second plurality of rocker members 24, facing in opposite directions (see, e.g., FIGS. 3-4).

First and second inner races 14, 16 are arranged axially side-by-side on an outer surface 50 of inner race hub 38. For example, first and second inner races 14, 16, may be pressed on outer surface 50 of inner race hub 38. First inner race 14 includes rocker teeth 42 on outer surface 46 and second inner race 16 includes rocker teeth 44 on outer surface 48.

Clutch assembly 10 may be switched between four modes of operation through rotation, in a first or a second rotational direction 54, 56, of first and second cages 18, 20 that are positioned radially between inner races 14, 16 and outer race 12 for enabling relative rotation therebetween. First and second cages 18, 20 are configured to selectively displace the first and second plurality of rocker members 22, 24, respectively, between a disengaged or freewheel position and an engaged position. That is, clutch assembly 10 may operate as a one-way clutch in either rotational direction, lock in both rotational directions, and freewheel in both rotational directions. First and second cages 18, 20 may be rotated through use of one or more external hydraulic actuators (not shown). When an actuator is activated, first and second cages 18, 20 may be rotated in one of two directions for disengaging the clutch, allowing freewheeling in one direction or move the cages 18, 20 in a position where clutch 10 behaves as a one-way clutch in either rotational direction. See, for example, FIGS. 6A and 6B.

First cage 18 includes a plurality of windows or openings 60 about a circumference of first cage 18. Likewise, second cage 20 includes a plurality of windows or openings 62 around a circumference of second cage 20. Individual rocker members of the first and the second plurality of rocker members 22, 24 are positioned within each of the windows or openings 60, 62, respectively. First and second cages 18, 20 may further include tabs 74, 76 extending into each window 60, 62 toward rocker members 22, 24. Tabs 74, 76 are configured to displace the rocker members 22, 24 to the disengaged (freewheel) position when the first and second cages are rotated in a first rotational direction 54 or a second rotational direction 56, opposite the first rotational direction 54.

Clutch assembly 10 further includes a plurality of biasing or spring members 70 configured to bias the first and second plurality of rocker members 22, 24 toward engagement with the rocker teeth 42, 44 of the first and second inner races 14, 16. The biasing members 70 may be leaf springs, for example. Moreover, the biasing members 70 may be retained in first and second cages 18, 20. Alternatively, biasing members 70 may be retained in the outer race 12. For example, biasing members 70 may be leaf springs having a first end 66 disposed in a groove 72 formed in the inner surface 28 of the outer race 12 and a second end 68, axially opposite the first end 66, arranged to engage with the rocker members 22, 24 (see, e.g., FIG. 7).

Each of the rocker members of the first and the second plurality of rocker members 22, 24 may be of suitable shape and design to engage with inner races 14, 16. For example, rocker members may include body portion 80, first segment 82 extending in a first axial direction, and second segment 84 extending in a second axial direction, opposite the first axial direction. Body portion 80 may be arranged between first and second segments 82, 84. That is, first and second segments 82, 84 may extend from opposite sides of body portion 80. Body portion 80 may further be arranged to engage with the pockets 26 of the outer race 12 such that body portion 80 is retained in outer race 12 pocket 26, the body portion 80 being pivotable within each pocket 26. The first segment 82 may be arranged to engage with the biasing members 70 and the second segment 84 may be arranged for engaging with the plurality of tabs 74, 76. That is, when first or second cage 20, 22 is rotated in one rotational direction, tabs 74, 76 contact second segment 84 and urges it to disengage from rocker teeth in a freewheel mode. Likewise, first or second cage 20, 22 may be rotated in the opposite rotational direction such that tabs 74, 76 are not acting on rocker member second segment 84 and spring member 70 contacts first segment 82 for biasing rocker member toward engagement with rocker teeth of inner races 14, 16.

Clutch assembly 10 may further include first and second cover plates 86, 88 configured to retain the one-way clutch 10 and center the outer race 12 relative to the inner race hub 38 and inner races 14, 16. First and second cover plates 86, 88 are assembled onto an outside of inner races 14, 16. First and second retaining rings 90, 92 are disposed in first and second grooves 94, 96 defined the inner race hub 38, respectively, configured to retain the first and second cover plates 86, 88.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 10 clutch assembly
12 outer race
14 first inner race
16 second inner race
18 first cage
20 second cage
22 first plurality of rocker members
24 second plurality of rocker members
26 pockets
28 inner surface
30 surface features
32 outer surface
34 first direction
36 second direction
38 inner race hub
42 rocker teeth
44 rocker teeth
46 outer surface
48 outer surface
50 outer surface
54 first rotational direction
56 second rotational direction
60 window or openings
62 window or openings
66 first end
68 second end
70 biasing or spring members
72 groove
74 tabs
76 tabs
80 body portion
82 rocker member first segment
84 rocker member second segment
86 first cover plate
88 second cover plate
90 first retaining ring
92 second retaining ring
94 first groove
96 second groove

What is claimed is:

1. A one-way clutch assembly, comprising:
an outer race having a plurality of pockets defined in an inner surface;
first and second inner races rotatable about an axis and aligned axially side-by-side, each having rocker teeth defined on an outer surface;
a first plurality of rocker members and a second plurality of rocker members, wherein one rocker member from the first plurality of rocker members and one rocker member from the second plurality of rocker members is disposed in each pocket of the outer race, wherein the first plurality of rocker members are arranged to face in a first direction and the second plurality of rocker members are arranged to face in a second direction, opposite the first direction;
first and second cages positioned radially between the inner and outer races, wherein the first and second cages are configured to selectively displace the first and second plurality of rocker members, respectively, between a disengaged position and an engaged position; and
a first plurality of biasing members retained in the first cage and a second plurality of biasing members retained in the second cage, wherein the first plurality and the second plurality of biasing members are configured to bias the first and the second plurality of rocker members toward engagement with the rocker teeth of the first and the second inner races, respectively.

2. The one-way clutch assembly of claim 1, wherein the biasing members are leaf springs.

3. The one-way clutch assembly of claim 1, wherein the first and second cages each include a plurality of openings distributed about a circumference thereof, wherein the first and second plurality of rocker members are positioned in the openings of the first and second cages, respectively.

4. The one-way clutch assembly of claim 3, wherein the first and second cages retain the first and second plurality of rocker members, respectively, in an axial and a radial direction.

5. The one-way clutch assembly of claim 3, wherein the first and second cages each include a plurality of tabs extending into each opening toward the rocker members, wherein the tabs are configured to displace the rocker members to the disengaged position when the first and second cages are rotated in a first rotational direction or a second rotational direction, opposite the first rotational direction.

6. The one-way clutch assembly of claim 1, wherein the outer race includes a plurality of splines defined on an outer surface for connecting to a transmission housing.

7. The one-way clutch assembly of claim 1, further comprising an inner race hub having first and second grooves defined in an outer surface, wherein the first and second inner races are pressed on the outer surface of the inner race hub.

8. The one-way clutch assembly of claim 7, further comprising:
    first and second cover plates configured to retain the one-way clutch and center the outer race to the inner race hub; and
    first and second retaining rings disposed in the first and second grooves of the inner race hub, respectively, configured to retain the first and second cover plates.

9. A one-way clutch assembly, comprising:
    an outer race having a plurality of pockets defined in an inner surface;
    first and second inner races arranged axially side-by-side on an inner race hub and each having rocker teeth defined on an outer surface;
    a first and a second plurality of rocker members, wherein one rocker member from the first plurality of rocker members and one rocker member from the second plurality of rocker members is disposed in each pocket of the outer race, the one rocker member of the first plurality of rocker members arranged to face in a first direction and the one rocker member of the second plurality of rocker members arranged to face in a second direction opposite the first direction;
    a plurality of biasing members arranged for biasing the first and second plurality of rocker members toward engagement with the rocker teeth of the first and second inner races, respectively; and
    first and second cages disposed between the inner and outer races, wherein rotation of the first and second cages in a first rotational direction or a second rotational direction, opposite the first rotational direction, moves the first and second plurality of rocker members between a disengaged position and an engaged position with respect to the rocker teeth of the first and second inner races, and wherein the plurality of biasing members are retained in the first and the second cage.

10. The one-way clutch of claim 9, wherein rotation of the first and second cages in the first or second rotational directions permits the one-way clutch to act as a one-way clutch in either direction, lock in both directions, and freewheel in both directions.

11. The one-way clutch assembly of claim 9, wherein the first and second cages include:
    a plurality of openings, each of the first and second plurality of rocker members being positioned in each of the openings of the first and second cages, respectively; and
    a plurality of tabs extending into each of the openings and arranged to urge the rocker members away from engagement with the rocker teeth.

12. The one-way clutch assembly of claim 11, wherein each of the rocker members includes:
    a body portion arranged to engage with the pockets of the outer race, the body portion being pivotable within each pocket;
    a first segment extending in a first axial direction arranged to engage with the biasing members and the rocker teeth; and
    a second segment extending in a second axial direction, opposite the first axial direction, arranged for engaging with the plurality of tabs.

* * * * *